United States Patent
Fought et al.

(10) Patent No.: US 6,845,425 B2
(45) Date of Patent: Jan. 18, 2005

(54) APPARATUS AND METHOD FOR STORING DATA INTO INCOMPATIBLY FORMATTED STORAGE SYSTEMS

(75) Inventors: Kevin Lynn Fought, Round Rock, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/015,241

(22) Filed: Dec. 13, 2001

(65) Prior Publication Data

US 2003/0115406 A1 Jun. 19, 2003

(51) Int. Cl.$^7$ .............................................. G06F 13/00
(52) U.S. Cl. ........................ 711/112; 711/114; 711/161; 711/162; 707/204; 714/6
(58) Field of Search ................................ 711/112, 114, 711/161, 162; 707/204; 714/6

(56) References Cited

U.S. PATENT DOCUMENTS

| | | | | |
|---|---|---|---|---|
| 5,435,004 A | * | 7/1995 | Cox et al. .................... | 707/205 |
| 5,544,347 A | * | 8/1996 | Yanai et al. ................. | 711/162 |
| 5,897,661 A | * | 4/1999 | Baranovsky et al. ........ | 711/170 |
| 6,047,294 A | * | 4/2000 | Deshayes et al. ........... | 707/204 |
| 6,216,211 B1 | * | 4/2001 | McBrearty et al. ......... | 711/162 |
| 6,269,381 B1 | * | 7/2001 | St. Pierre et al. ........... | 707/202 |
| 6,366,986 B1 | * | 4/2002 | St. Pierre et al. ........... | 711/162 |
| 6,487,561 B1 | * | 11/2002 | Ofek et al. .................. | 707/204 |
| 6,505,216 B1 | * | 1/2003 | Schutzman et al. ......... | 707/204 |
| 6,662,268 B1 | * | 12/2003 | McBrearty et al. ......... | 711/114 |
| 2002/0002661 A1 | * | 1/2002 | Blumenau et al. .......... | 711/165 |
| 2002/0073268 A1 | * | 6/2002 | Peloquin et al. ............... | 711/6 |
| 2003/0014599 A1 | * | 1/2003 | McBrearty et al. ......... | 711/148 |

\* cited by examiner

*Primary Examiner*—Stephen Elmore
(74) *Attorney, Agent, or Firm*—Volel Emile; Mark E. McBurney

(57) ABSTRACT

A method, system and apparatus for storing data into two incompatibly formatted storage systems are provided. When a data is to be stored, it is first determined whether the data is to be stored into the two incompatibly formatted storage systems which are each being managed by a logical volume manager (LVM). If so, the data is forwarded to the two storage systems. In a particular embodiment, when the data is to be stored, one of the two LVMs determines whether the data is to be stored into the two storage systems. If so determined, the LVM that has made the determination passes a copy of the data to the other LVM. The two LVMs then ensure that the data is appropriately stored. When data is to be read from an incompatible storage system, the first LVM will request the data from the second LVM, when the data is received, the first LVM converts the data into an understandable format before the data is used.

22 Claims, 7 Drawing Sheets

APPARATUS AND METHOD FOR STORING DATA INTO INCOMPATIBLY FORMATTED STORAGE SYSTEMS

BACKGROUND OF THE INVENTION

1. Technical Field

The present invention is directed to a method and apparatus for managing data storages. More specifically, the present invention is directed to a method and apparatus for storing a piece of data into incompatibly formatted storage systems.

2. Description of Related Art

In recent years, computer systems have experienced great advances in processor speed, performance, available memory, and system architecture. Often times, they are rendered obsolete within months of being announced. Large customers, such as, major corporations and other institutions that want or need to keep their systems at or near state-of-the-art performance levels are constantly upgrading their computer systems. Generally, these large customers tend to maintain brand loyalty. This often occurs for a variety of reasons of which the following are but a few: (1) no need to retrain personnel, (2) data compatibility, (3) cost. The present invention provides a solution to the data compatibility issue and, thus, affords these customers a greater degree of freedom to choose among a plurality of computer systems when upgrading to newer and faster systems.

One of the reasons for data incompatibility is that some computer systems format data differently than others. In addition, this differently formatted data is often stored into storage systems that are themselves formatted differently than those used by the other computer systems. For example, Sun Microsystems computer systems running Solaris operating system (OS) format and store data differently than IBM computer systems running AIX OS, although both Solaris and AIX OSs are UNIX-based OSs. Hence, data from a Sun Microsystems computer system is not compatible with an IBM computer system and vice versa.

Consequently, when a customer upgrades from one set of computer systems to another set that is incompatible with the first set, the older machines are not ordinarily used anymore. The data that was generated by the older computer systems may continue to be used if converted into a format compatible with the new computer systems. However, as is well known in the field, most conversion algorithms are not ideal and therefore, often times not all the data is converted.

What is needed, therefore, is an apparatus and method of storing copies of data into incompatibly formatted data storage systems, thus, allowing customers to upgrade to newer computer systems and have previously-stored data be available without conversion.

SUMMARY OF THE INVENTION

The present invention provides a method, system and apparatus for storing data into two incompatibly formatted storage systems. When a data is to be stored, it is first determined whether the data is to be stored into the two incompatibly formatted storage systems, which are each managed by a logical volume manager (LVM). If so, the data is forwarded to the two storage systems to be stored. In a particular embodiment, when the data is to be stored, one of the two LVMs determines whether the data is to be stored into the two storage systems. If so, a copy of the data will be transferred to the other LVM for storage. The two LVMs then ensure that the data is appropriately stored. When data is to be read from an incompatible storage system, the first LVM may request the data from the second LVM, when the data is received, the first LVM converts the data into an understandable format before the data is used.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
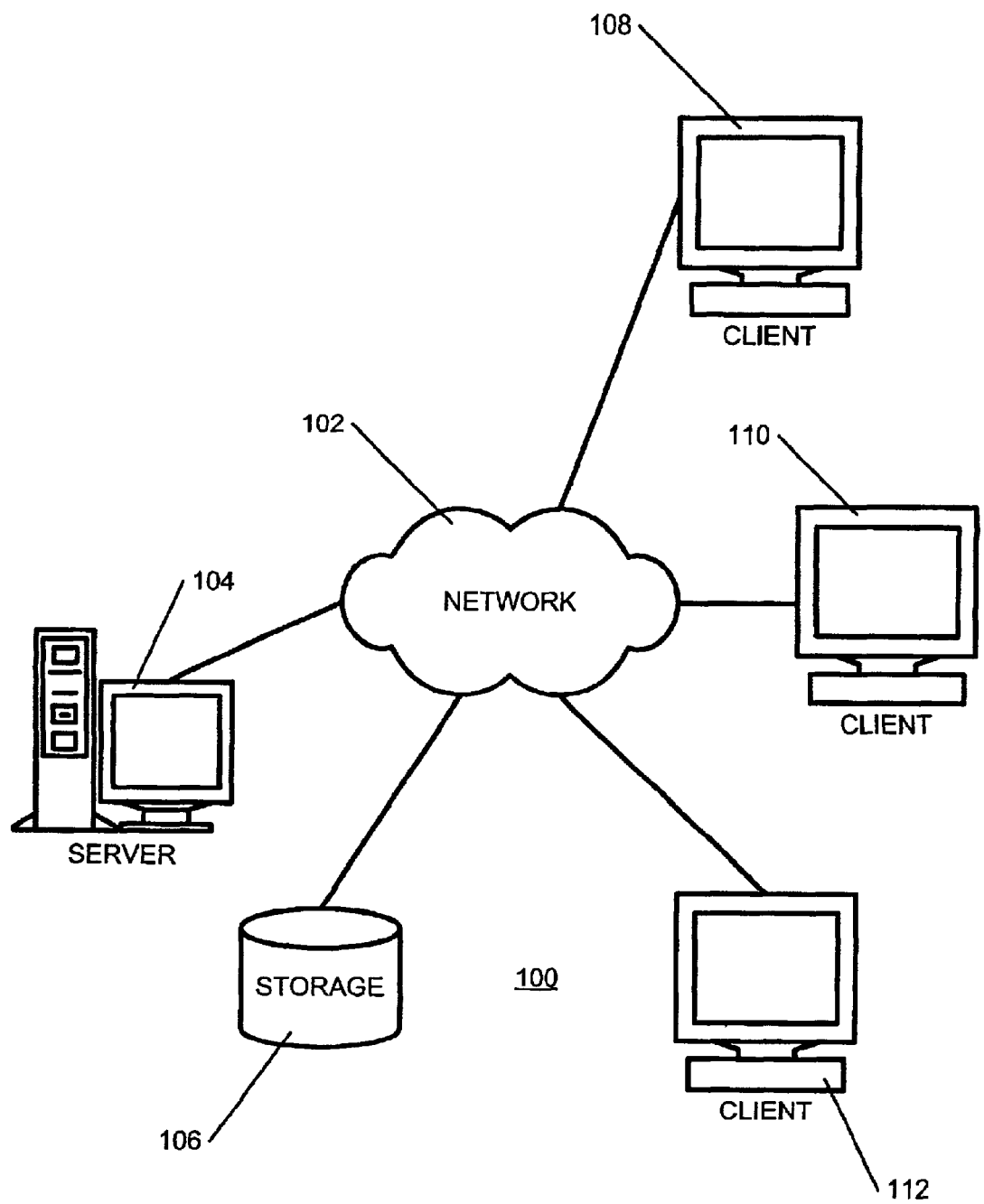
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
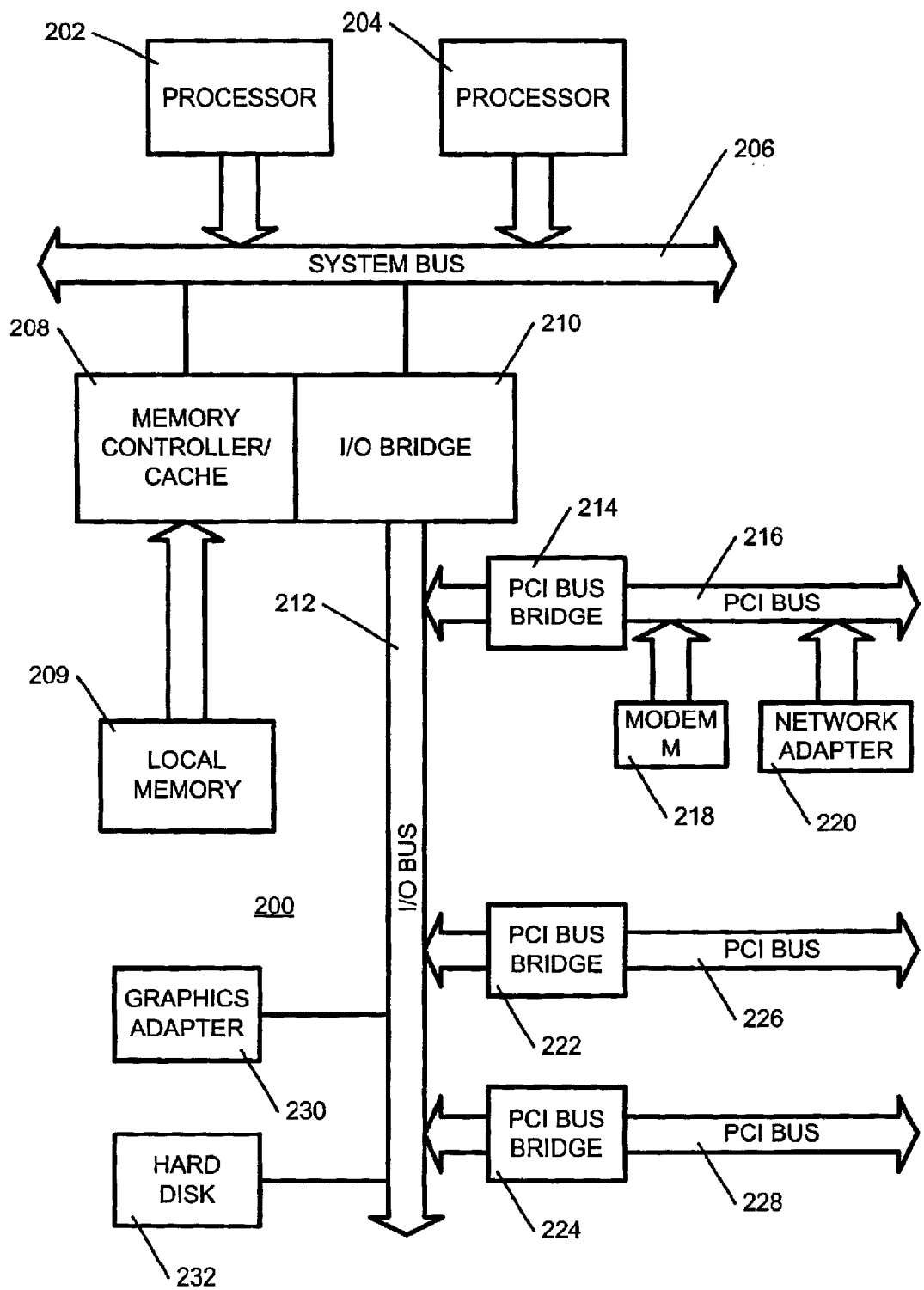
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
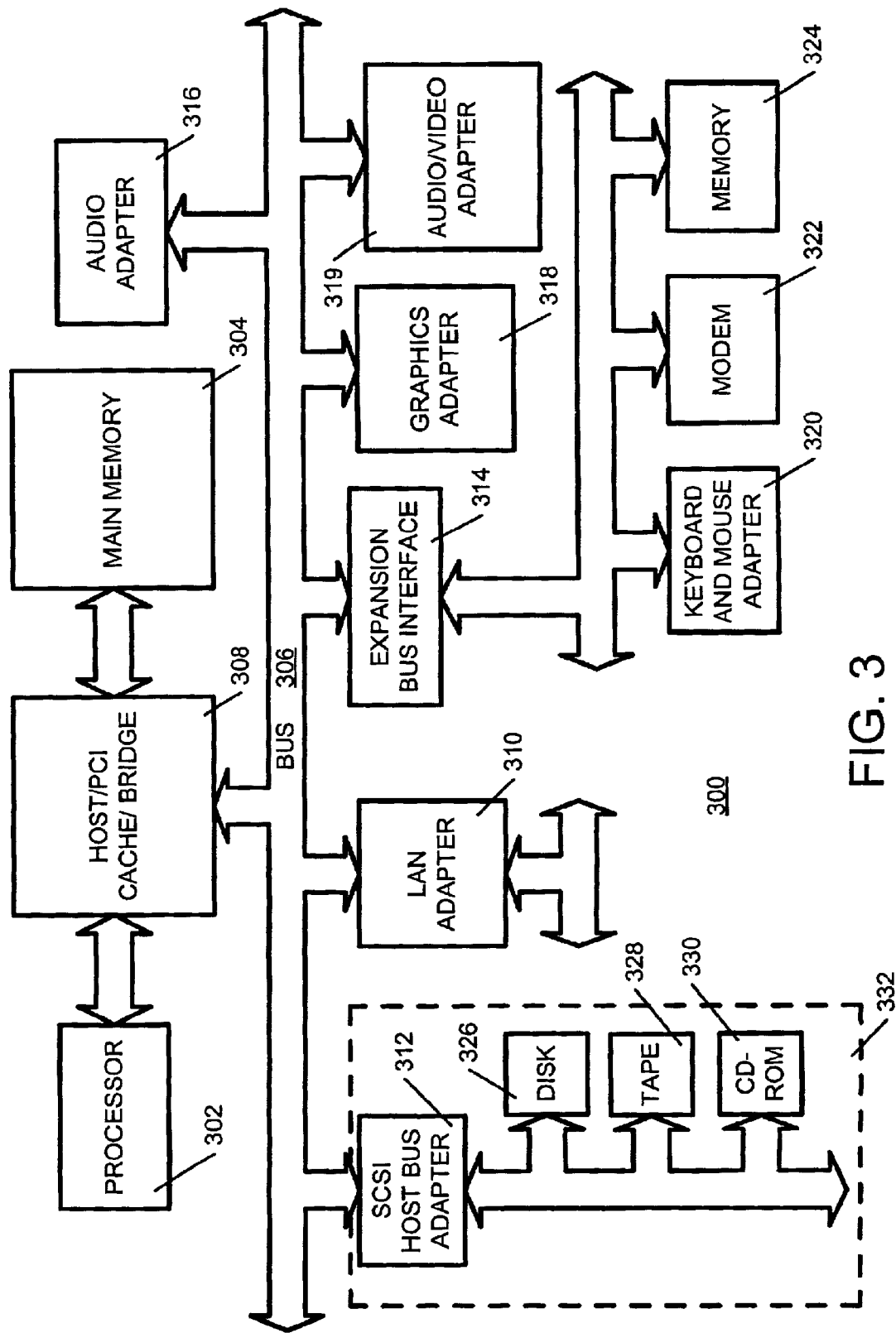
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus and method of storing data into incompatibly formatted storage systems, thus, allowing sets of incompatible computer systems to use the data. Although the invention may preferably be local to server 104, it may nonetheless, be local to client systems 108, 110 and 112 of FIG. 1 or to both the server 104 and clients 108, 110 and 112. Consequently, the present invention may reside on any data storage medium (i.e., floppy disk, compact disk, hard disk, ROM, RAM, etc.) used by a computer system.

Most servers use a plurality of physical storage systems. To fully take advantage of these physical storage systems, the servers make use of an abstraction layer called a logical volume manager (LVM) when storing and retrieving data. Volume, in this case, is the storage capacity of a physical storage system. Thus, volume and physical storage system will henceforth be used interchangeably.

The LVM arranges the physical storage systems into volume groups in order to give the impression that storage systems having each a much more voluminous storage capacity are being used. Within each volume group, one or more logical volumes may be defined. Data stored in a logical volume appears to be stored contiguously. In actuality the data may be interspersed throughout many different locations across all the physical storage systems that make up the volume group.

Stated differently, each logical volume in a logical volume group is divided into logical partitions. Likewise, each physical volume in a volume group is divided into physical partitions. Each logical partition corresponds to at least one physical partition. But, although the logical partitions in a logical volume are numbered consecutively or appear to be contiguous to each other, the physical partitions to which they each correspond need not be contiguous to each other. And indeed, most often, the physical partitions are not contiguous to each other. Thus, one of the many tasks of the LVM is to keep tab on which physical partition or partitions correspond to a logical partition.

For fault tolerance and performance, some servers store more than one copy of each piece of data onto the physical storage systems they use. Storing two or more copies of a piece of data is called mirroring the data. In order to mirror data, each logical partition must correspond to as many physical partitions as there are mirrors (or copies) of the data. In other words, if the data is to be mirrored three times, each logical partition has to correspond to three physical partitions.

Figure 4:
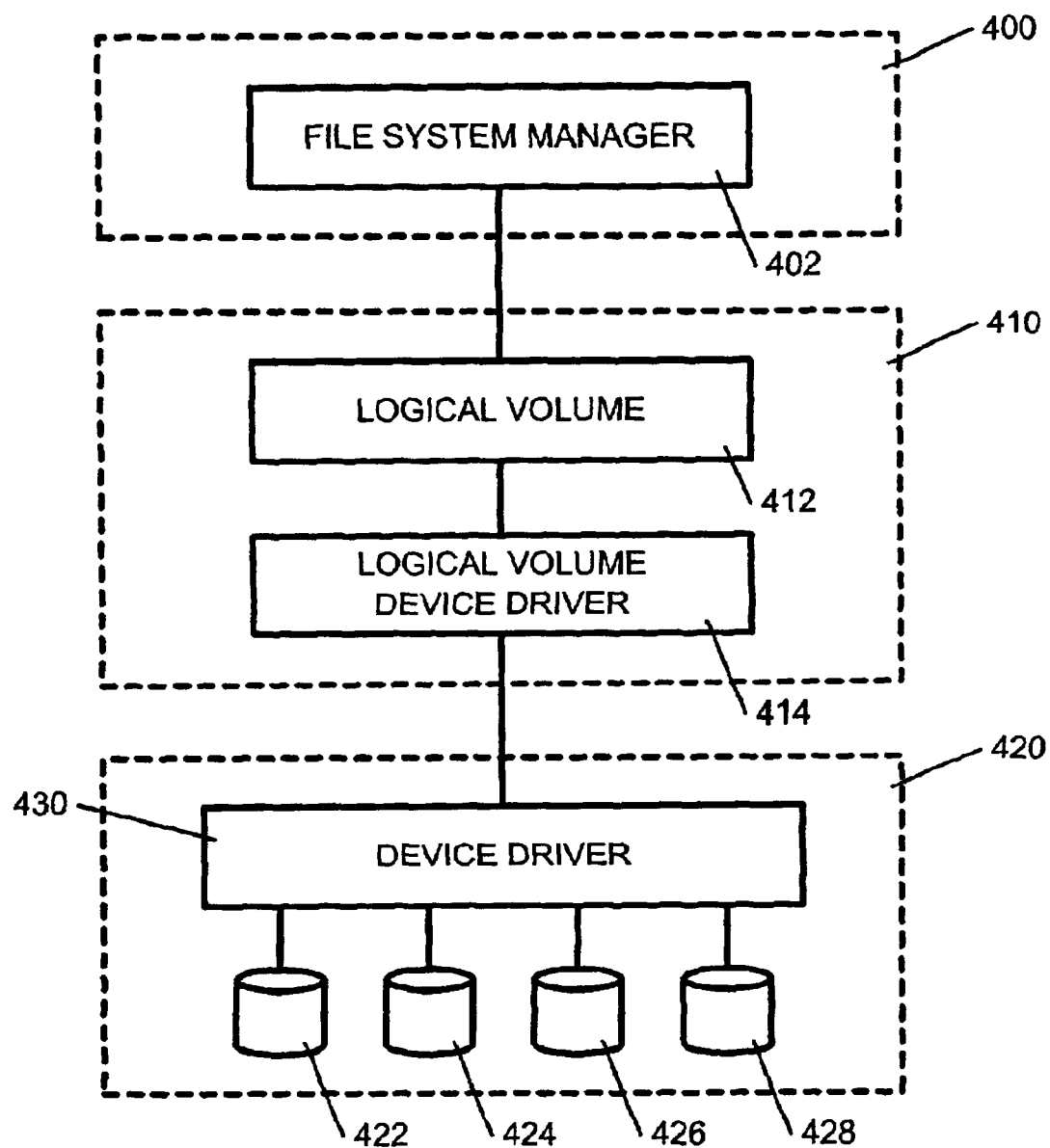
FIG. 4 is a conceptual view of an LVM.

FIG. 4 is a conceptual view of an LVM. In FIG. 4 three layers are depicted, an application layer 400, a logical layer 410 and a physical layer 420 each having one or more devices. It should be noted that the devices shown in the three layers are not all inclusive. There may be more devices in use in each of the application layer 400 the logical layer 410 and the physical layer 420. Thus, the devices in FIG. 4 should be taken only as an example of devices that may be used.

The logical layer 410, for all intent and purpose, is the LVM. The LVM may be regarded as being made up of a set of operating system commands, library subroutines or other tools that allow a user to establish and control logical volume storage. The LVM controls physical storage system resources by mapping data between a simple and flexible logical view of the storage space and the actual physical storage system. The LVM does this by using a layer of device driver code that runs above traditional device drivers. This logical view of the disk storage is provided to application programs and is independent of the underlying physical disk structure. The logical layer 410 contains a logical volume 412 that interacts with logical volume device driver 414. A device driver, as is well known in the art, acts as a translator between a device and programs that use the device. That is, the device driver accepts generic commands from programs and translates them into specialized commands for the device. In this case, the logical volume device driver 414 translates commands from an application program executing on the computer system for device driver 430. When an application program sends commands to file system manager 402 to store or retrieve data from logical volume 412, the file system manager 402 informs the logical volume 412 of the application program's wish. The logical volume 412 then conveys the wish to the logical volume device driver 414. The logical volume device driver 414 then consults the appropriate mirroring map, policies etc. and instructs the device driver 430 which ones of physical storage systems 422, 424, 426 and 428 to use for the data.

Thus, if the data being stored is to be mirrored, the data will be stored according to an appropriate mirroring map (e.g., data from each logical partition will be stored in more than one physical partition of the storage systems as per the mirroring map). The mirroring map is usually entered into the LVM by a system administrator. Mirroring data is described in APPARATUS AND METHOD OF CREATING A MIRRORING MAP FOR USE WITH DIFFERENT PIECES OF DATA, Ser. No. 10/015,223, filed on Dec. 12, 2001, the disclosure of which is herein incorporated by reference.

Figure 5:
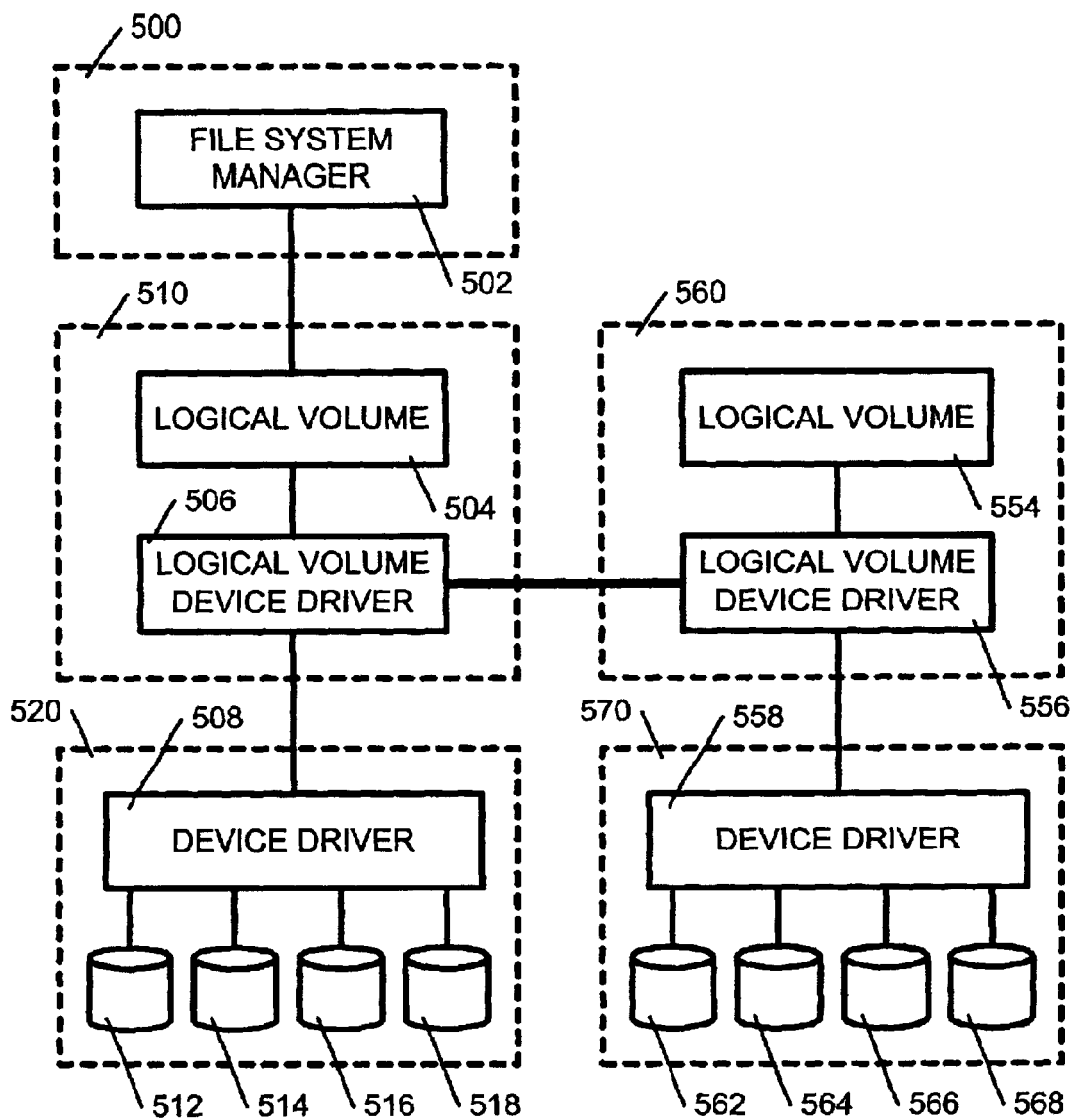
FIG. 5 depicts two storage management systems for two computer systems.

FIG. 5 depicts two storage management systems that are used on a computer system. The first storage management system includes an application layer 500, a logical layer 510 and a physical layer 520. The application layer contains a file system manager 502. The logical layer 510, which is the LVM, contains logical volume 504 and logical volume device driver 506. The physical layer 520 has therein a device driver 508 that interacts with storage devices 512, 514, 516 and 518. The second storage management system includes a logical layer 560 and a physical layer 570. The logical layer 560, which is the LVM for this storage management system, contains logical volume 554 and logical volume device driver 556. The physical layer 570 has therein a device driver 558 that interacts with storage devices 562, 564, 566 and 568. The elements in FIG. 5 perform the same function as similar elements described in FIG. 4.

In any event, the two storage management systems in FIG. 5 are dissimilar and incompatibly formatted. Logical volume device driver 506 of LVM 510 is connected to logical volume device driver 556 of LVM 560. Accordingly, when a piece of data being stored on the computer system is to be mirrored and if the data is to be stored into the two physical storage systems, the logical volume device driver 506 will forward a copy of the data to logical volume device driver 556. The logical volume device driver 556 will then instruct device driver 558 to store the data into any or all of physical storage systems 562, 564, 566 and 568 as per a storage map. Meanwhile the other mirrored copy or copies of the data will be stored into any or all of physical storage systems 512, 514, 516 and 518 of the first computer system.

Figure 6:
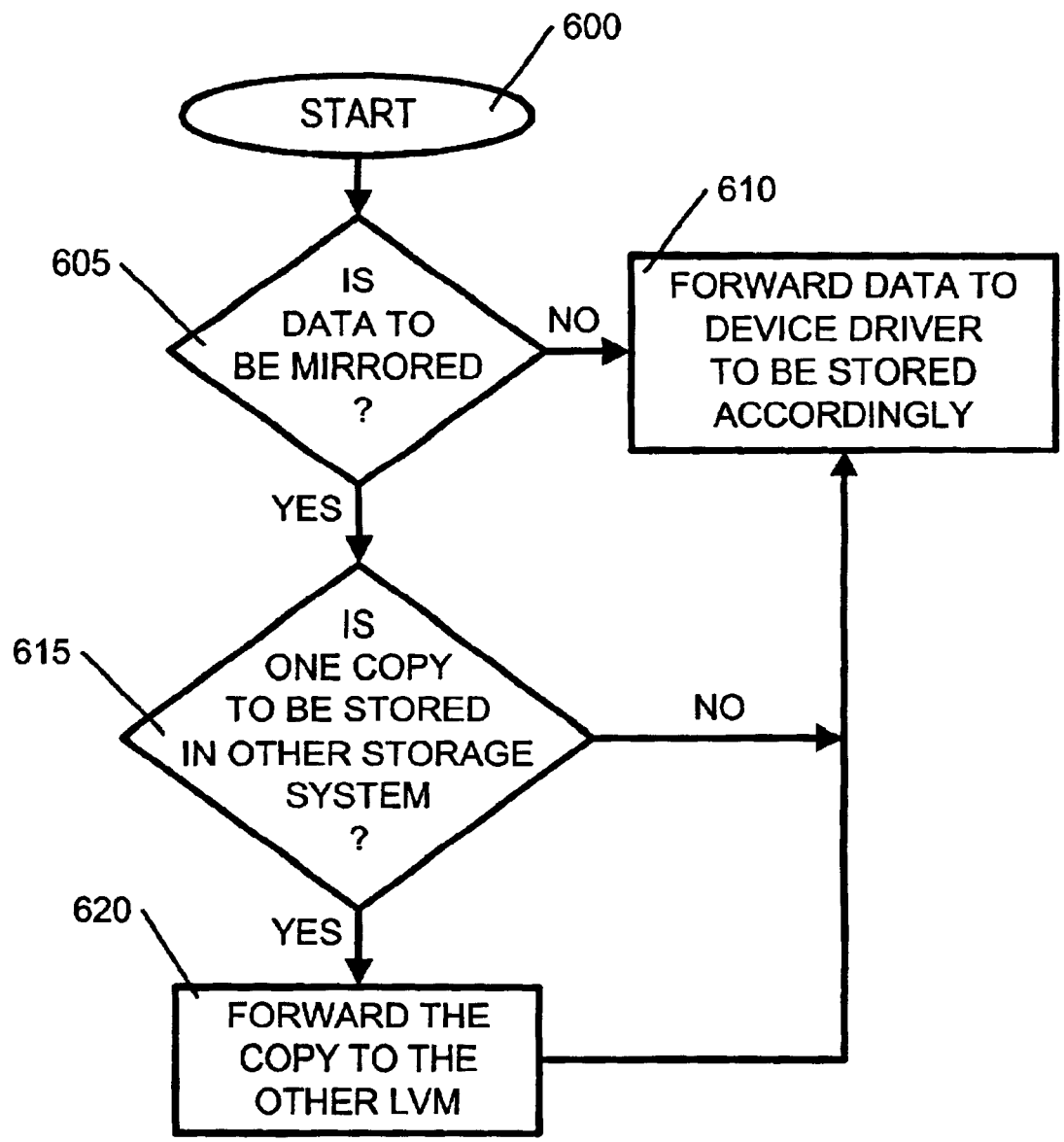
FIG. 6 is a flow chart of a process that may be used to enable mirrored copies of a piece of data to be stored in two incompatible physical storage systems.

FIG. 6 is a flow chart of a process that may be used to enable mirrored copies of a piece of data to be stored in two incompatible physical storage systems. The process starts whenever data is to be stored (step 600). Then, $LVM_1$, by consulting its map, determines whether the data is to be mirrored. If so, $LVM_1$ again determines whether one copy of the data is to be stored in the other physical storage system. If so, the copy is forwarded to $LVM_2$ (steps 600, 605, 615 and 620). When $LVM_2$ receives the data, it will instruct its own device driver to store the data accordingly.

$LVM_1$ will also instruct its device driver to store the data in accordance with its mirroring map. If the data is not to be mirrored or if the data is to be mirrored only within the first physical storage system, $LVM_1$ then merely needs to instruct its device driver to store the data as per the map (step 610).

Figure 7:
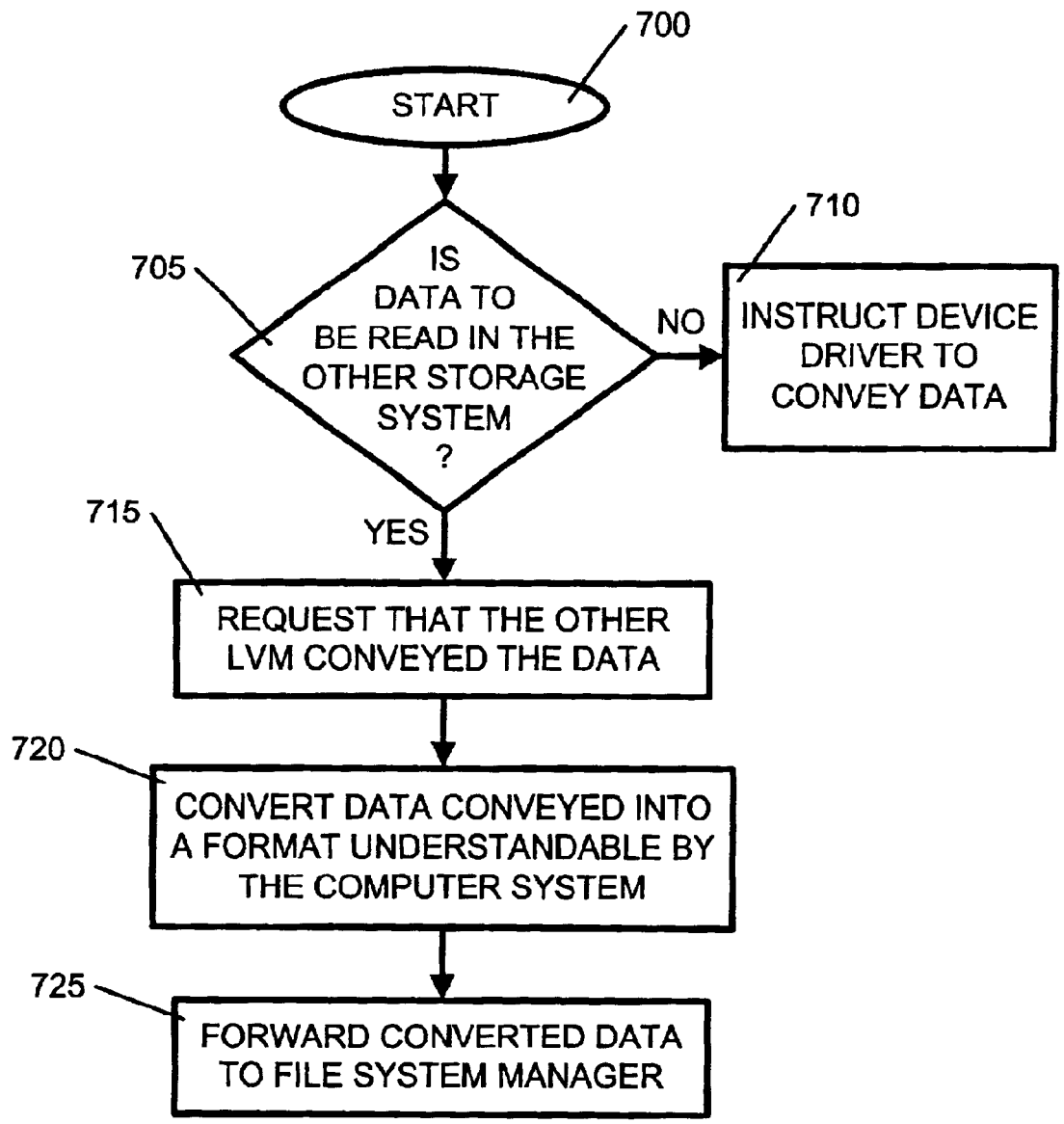
FIG. 7 is a flow diagram of a process that may be used to retrieve data from an incompatible storage system. The process starts when data is to be read.

FIG. 7 is a flow diagram of a process that may be used to retrieve data from an incompatible storage system. The process starts when data is to be read. Then $LVM_1$ makes a check to determine whether the data is stored in its own physical storage system. If so, it merely has to instruct its device driver to retrieve the data. The retrieved data can then be forwarded to the File system manager (steps 705 and 710). If the data resides in the other physical storage system, $LVM_1$ will request that $LVM_2$ convey the data. At that instant $LVM_2$ will instruct its own device driver to retrieve the data. Once retrieved, the data will be forwarded to $LVM_1$. When $LVM_1$ receives the data, it will have to convert the data in a format that is understandable to the computer system. When done, the data will then be forwarded to the file system manager (steps 705, 715, 720 and 725).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of storing data into two storage systems, the two storage systems being incompatibly formatted with each other, the method comprising the steps of:

determining whether the data is to be stored into the two storage systems; and forwarding the data, if the data is to be stored into the two storage systems, to two logical volume managers (LVMs) for storing the data, each one of the two LVMs managing one of the two storage systems.

2. The method of claim 1 wherein the determining step is performed by one of the two LVMs.

3. A method of storing data into two storage systems, the two storage systems being incompatibly formatted with each other, the method comprising the steps of:

forwarding the data to a first logical volume manager (LVH), the first LVM determining whether the data is to be stored into the two storage systems; and forwarding the data to a second LVM for storage if so determined.

4. A method of reading data by a computer system comprising the steps of:

determining whether the data is to be read from a storage system that is incompatibly formatted with storage systems that the computer system ordinarily uses;

requesting the data from the storage system, the requesting step being performed by a first logical volume manager (LVM) and sent to a second LVM;

converting the data into a format compatible with a format of data stored in the storage system that the computer system ordinarily uses; and forwarding the data to the computer system.

5. The method of claim 4 wherein the converting step is performed by the first LVM.

6. A computer program product on a computer readable medium for storing data into two storage systems, the two storage system being incompatibly formatted with each other, the computer program product comprising:

code means for determining whether the data is to be stored into the two storage systems; and code means, if the data is to be stored in the two storage systems, for forwarding the data to two logical volume managers (LVMs) for storage, each one of the two LVMs managing one of the two storage systems.

7. A computer program product on a computer readable medium for storing data into two storage systems, the two storage systems being incompatibly formatted with each other, the computer program product comprising:

first code means for forwarding the data to a first logical volume manager (LVM), the first LVM determining whether the data is to be stored into the two storage systems; and second code means for forwarding the data to a second LVM for storage if so determined.

8. An apparatus for storing data into two storage systems, the two storage systems being incompatibly formatted with each other, the apparatus comprising:

means for determining whether the data is to be stored into the two storage systems; and means, if the data is to be stored into the two storage systems, for forwarding the data to two logical volume managers (LVMs) for storage, each one of the two LVMs managing one of the two storage systems.

9. An apparatus for storing data into two storage systems, the two storage systems being incompatibly formatted with each other, the apparatus comprising:

first means for forwarding the data to a first logical volume manager (LVM), the first LVM determining whether the data is to be stored into the two storage systems; and second means for forwarding the data to a second LVM for storage if so determined.

10. A computer system for storing data into two storage systems, the two storage systems being incompatibly formatted with each other, the computer system comprising:

at least one storage device for storing code data; and at least one processor for processing the code data to determine whether the data is to be stored into the two storage systems and to forward the data, if the data is to be stored into the two storage systems, to two logical volume managers (LVMs) for storing the data, each one of the two LVMs managing one of the two storage systems.

11. A computer system for storing data into two storage systems, the two storage systems being incompatibly formatted with each other, the computer system comprising:

at least one storage device for holding code data; and at least one processor for processing the code data to forward the data to a first logical volume manager (LVM), the first LVM determining whether the data is to be stored into the two storage systems and to forward the data to a second LVM for storage if so determined.

12. A method of storing data into two storage systems, the two storage systems being incompatibly formatted with each other, the method comprising the steps of:

determining whether the data is to be stored into the two storage systems; and forwarding the data, if the data is to be stored into the two storage systems, to two logical volume managers (LVMs) for storing the data, each one of the two LVMs managing one of the two storage systems and one of the two LVMs determining whether the data is to be stored into the two storage systems and forwarding the data to the other LVM if it is so determined.

13. The method of claim 12 wherein the data is forwarded to the LVM that is not performing the determining step.

14. A method of storing data into two storage systems, the two storage systems being incompatibly formatted with each other, the method comprising the steps of:

forwarding the data to a first logical volume manager (LVM), the first LVM determining whether the data is to be stored into the two storage systems; and forwarding the data, using the first LVM, to a second LVM for storage if so determined.

15. A method of storing data into a first and a second storage systems, the first storage system for storing data that is compatible with data usable by a system and the second storage system for storing data that is incompatible with data usable by the system, the method comprising the steps of:

determining whether the data is to be stored into the first and the second storage systems, the data being formatted to be stored in the first storage system; and storing the data, if the data is to be stored in the first and the second storage systems, in the first and the second storage systems by forwarding the data to a first logical volume manager (LVM) and a second LVM, the second LVM for converting the data into a format compatible with format of data stored in the second storage system.

16. A method of storing data into a first and a second storage systems, the first storage system for storing data that is compatible with data usable by a system and the second storage system for storing data that is incompatible with data usable by the system, the method comprising the steps of:

forwarding the data to a first logical volume manager (LVM), the data being formatted to be stored in the first storage system, the first LVM determining whether the data is to be stored into the first and the second storage systems; and forwarding, if it is determined that the data is to be stored into the first and the second storage systems, the data to a second LVM for storing the data into the second storage system, the second LVM for converting the data into a format compatible with format of data stored in the second storage system.

17. A computer program product on a computer readable medium for storing data into a first and second storage systems, the first storage system for storing data that is compatible with data usable by a system and the second storage system for storing data that is incompatible with data usable by the system, the computer program product comprising:

code means for determining whether the data is to be stored into the first and the second storage systems, the data being in a format compatible with data stored in the first storage system; and code means for storing the data, if the data is to be stored in the first and the second storage systems, in the first and the second storage systems by forwarding the data to a first logical volume manager (LVM) and a second LVM, the second LVM for converting the data into a format compatible to format of data stored in the second storage system.

18. A computer program product on a computer readable medium for storing data into a first and a second storage systems, the first storage system for storing data that is compatible with date usable by a system and the second storage system for storing data that is incompatible with data usable by the system, the computer program product comprising:

first code means for forwarding the data to a first logical volume manager (LVM), the first LVM determining whether the data is to be stored into the first and the second storage systems; and second code means, if the data is to be stored in the first and the second storage systems, for forwarding the data to a second LVM, the second LVM for converting the data into a format compatible with format of data stored in the second storage system.

19. An apparatus for storing data into a first and a second storage systems, the first storage system for storing data having a format compatible with format of data usable by a system, the second storage system for storing data having a format that is incompatible with format of data usable by the system, the apparatus comprising:

means for determining whether the data is to be stored into the first and the second storage systems, the data having a format compatible with format of data usable by the system; and means for storing the data, if the data is to be stored in the first and the second storage systems, in the first and the second storage systems by forwarding the data to a first logical volume manager (LVM) and a second LVM, the second LVM for converting the data into a format compatible with format of data stored in the second storage system.

20. An apparatus for storing data into a first and a second storage systems, the first storage system for storing data having a format compatible with format of data usable by a system, the second storage system for storing data having a format that is incompatible with format of data usable by the system, the apparatus comprising:

first means for forwarding the data to a first logical volume manager (LVM), the first LVM determining whether the data is to be stored into the first and the second storage systems, the data being in a format compatible with format of data usable by the system;

second means, if the data is to be stored in the first and the second storage systems, for forwarding the data to a second LVM, the second LVM for converting the data into a format compatible with format of data stored in the second storage system; and means for storing the data in the first and the second storage systems.

21. A computer system for storing data into a first and a second storage systems, the first storage system for storing data having a format compatible with format of data usable by the computer system, the second storage system for storing data having a format that is incompatible with format of data usable by the computer system, the computer system comprising:

at least one storage device for storing code data; and at least one processor for processing the code data to determine whether the data is to be stored into the first and the second storage systems, the data being in a format that is compatible with format of data stored in the first storage system and to store the data, if the data is to be stored in the first and the second storage systems, in the first and the second storage systems by forwarding the data to a first logical volume manager (LVM) and a second LVM, the second LVM for converting the data into a format compatible with format of data stored in the second storage system.

22. A computer system for storing data into a first and a second storage systems, the first storage system for storing data having a format compatible with format of data that is usable by the computer system, the second storage system for storing data having a format that is incompatible with format of data that is usable by the computer system, the computer system comprising:

at least one storage device for storing code data; and at least one processor for processing the code data to forward the data to a first logical volume manager (LVM), the first LVM determining whether the data is to be stored into the first and the second storage systems, the data being in a format compatible with format of data usable by the computer system and to forward the data, if the data is to be stored into the first and the second storage systems, to a second LVM, the second LVM for converting the data into a format compatible with format of data stored into the second storage system and to store the data into the first and the second storage systems.

* * * * *